(12) United States Patent
Fu

(10) Patent No.: US 7,270,024 B2
(45) Date of Patent: Sep. 18, 2007

(54) ROTARY SHAFT HERMETIC SEALING DEVICE

(76) Inventor: Wei Fu, 18 O'Day Dr., Endicott, NY (US) 13760

( * ) Notice: Subject to any disclaimer, the term of this patent is extended or adjusted under 35 U.S.C. 154(b) by 672 days.

(21) Appl. No.: 10/780,131

(22) Filed: Feb. 18, 2004

(65) Prior Publication Data

US 2005/0178237 A1     Aug. 18, 2005

(51) Int. Cl.
    *F16J 15/50* (2006.01)
(52) U.S. Cl. .............................. 74/17.8; 74/18.1; 74/86
(58) Field of Classification Search ................ 74/17.8, 74/18, 18.1, 63, 68, 86
    See application file for complete search history.

(56) References Cited

U.S. PATENT DOCUMENTS

| | | | | |
|---|---|---|---|---|
| 3,252,341 A | * | 5/1966 | Reiter | 74/18.1 |
| 3,416,379 A | * | 12/1968 | Robbins | 74/18.1 |
| 4,337,952 A | * | 7/1982 | Wagner | 277/634 |
| 4,646,579 A | * | 3/1987 | Klein | 74/18.1 |
| 6,119,537 A | * | 9/2000 | Jost | 74/18.1 |

OTHER PUBLICATIONS

Muller, Heinz K. and Nau, Bernard S., Fluid Sealing Technology pp. 395, 400-401, 1998, CRC Press.

* cited by examiner

*Primary Examiner*—William C Joyce

(57) ABSTRACT

A drive crank shaft and a load shaft with an eccentrically placed center shaft coupler form a mechanical torque transferring structure. Two convoluted rubber seals mounted on a center shaft coupler, a drive shaft support an a load shaft support enclose the working fluid to form double hermetic sealing. The rubber seals exert enough force against twisting to hold the center shaft coupler and prevent the center shaft coupler from rotating around its center. Two balance weights are mounted on both crank shafts symmetrically to eliminate vibration due to eccentric configuration. An enclosed housing prevents fluid from leaking into the environment. A sensor is used to detect the leakage and control the operation. This rotary shaft sealing device provides dynamically hermetic sealing by eliminating a leaking path for the pressurized working fluid.

20 Claims, 17 Drawing Sheets

ROTARY SHAFT HERMETIC SEALING DEVICE

FIELD OF THE INVENTION

The present invention relates to rotary shaft sealing devices and, more specifically, to a device for dynamically and hermetically sealing a rotary shaft under various rpm's and load capabilities for pressurized working fluid.

BACKGROUND OF THE INVENTION

Rotary shaft sealing is classified as dynamic sealing. Since there is relative movement between a rotating shaft surface and its surrounding wall, a clearance gap exists and fluid will eventually leak through this gap no matter how small it is. There are some practical sealing methods for rotary shafts: labyrinths, stuffing boxes, lip seals, bushings, and spiral-groove seals. Also, mechanical seals made out of a very large number of materials are commonly used for sealing rotating shafts. However, all of the above are not hermetic sealing methods. They can only reduce or delay the leakage of fluid. This can not be tolerated for industrial areas that handle toxic and radioactive fluid, for example. The leakage of fluid through the rotary shaft also becomes a main problem in many industrial machine designs.

Other solutions of rotary shaft hermetic sealing are found in "Fluid Sealing Technology-Principles and Applications", by Heinz K. Muller and Bernard S. Nau. In the Muller book, the first example provided is hermetic sealing through a nonmagnetic diaphragm and magnetic transmission of motion. Another example uses metal bellows that envelop a crank in which its axis follows a conical orbit during rotation. The movement can then be transferred through an angled bore in the end of the output shaft.

Both solutions mentioned above have critical disadvantages: using magnetic force does not fully transfer the torque since the drive shaft and the load shaft are not physically connected. Also, the output rotation has phase lag with respect to the input rotation, making it uncontrollable. The second solution, on the other hand, has a physical connection between the input shaft and the output shaft though an angled bore, but its structure is not capable of high rpm's. The configuration of this structure easily deforms if large amounts of torque and load are applied.

It is therefore an object of the invention to function as a hermetic sealing for rotary shafts.

It is another object of the invention to fully transfer the drive torque in the same way as a continuous solid shaft.

It is another object of the invention to monitor defective rubber seal failure and control rotary shaft operation.

It is another object of the invention to work in both static and dynamic environments.

It is another object of the invention to work under various rpm's.

It is another object of the invention to work under various loads.

It is another object of the invention to work longer without replacements of sealing parts.

It is another object of the invention to work under a pressurized environment.

It is another object of the invention to simplify the rotary shaft without a highly expensive surface finishing.

It is another object of the invention to be environmentally friendly.

It is another object of the invention to be economically efficient.

SUMMARY OF THE INVENTION

In accordance with the present invention, a drive crank shaft and a load crank shaft are provided. Both crank shafts have two cylindrical sections with different lengths and diameters. The short cylindrical section has a larger diameter than the long cylindrical section. The two sections are physically jointed to form one operational crank shaft. There is an eccentric bore in the end of the short section of the crank shaft in which a bearing is inserted. The tolerance of the bore is set so that the outer ring of the bearing fits tightly inside. A center shaft coupler has three sections. The first section is the coupler drive shaft. It is a piece of cylindrical shaft with a diameter equal to the inner diameter of the coupler drive bearing in the eccentric bore of the drive crank shaft. The second section is the coupler load shaft. It is also a piece of cylindrical shaft with a diameter equal to the inner diameter of the coupler load bearing in the eccentric bore of the load crank shaft. The third section of the center shaft coupler is a strong, solid, metal disk with several mounting screw holes along its circular edge on both sides. All three sections are rigidly connected to form an operational center shaft coupler. Both ends of the center shaft coupler are inserted into the corresponding bearings in the eccentric bore of each crank shaft to connect the drive crank shaft to the load crank shaft.

There are also two identical convoluted rubber seals. One side of each convoluted rubber seal is symmetrically mounted on both sides of the coupler sealing disk with metal washers and screws, which are used to form seamless sealing. The other side of each rubber seals is mounted on the inner surface of the drive shaft support and on the load shaft support respectively. Both the drive crank shaft and the load crank shaft are supported by corresponding bearings that are located inside the drive shaft support and the load shaft support. The drive shaft support and the load shaft support are then mounted to the housing with two housing covers and two rubber gaskets to form an operational solid base for the device.

BRIEF DESCRIPTION OF THE DRAWINGS

A complete understanding of the present invention may be obtained by reference to the accompanying drawings, when considered in conjunction with the subsequent, detailed description, in which.

DESCRIPTION OF THE PREFERRED EMBODIMENT

Figure 1:
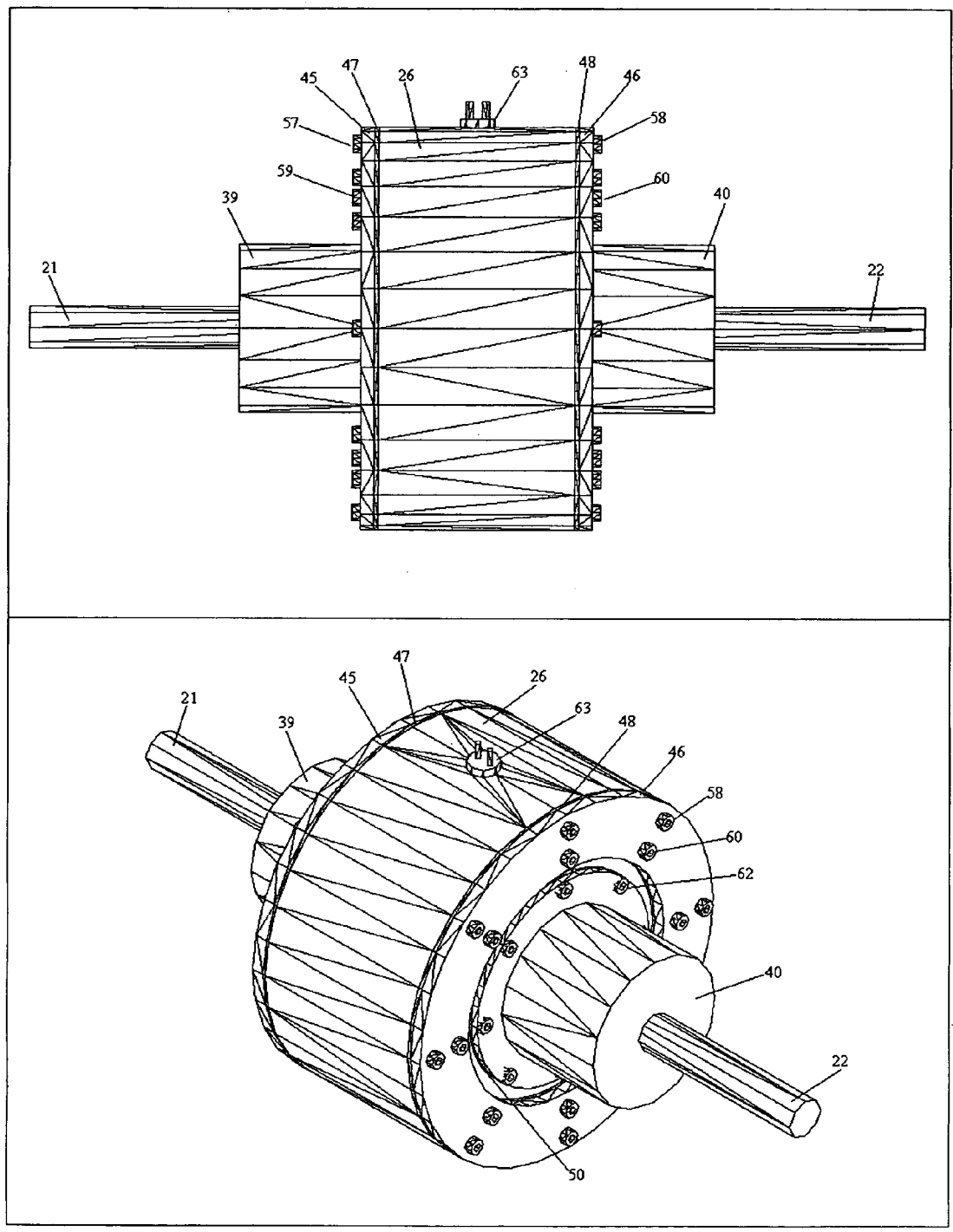
FIG. 1 is a perspective view of a rotary shaft sealing device of the present invention.

The drive crank shaft 21 and the load crank shaft 22 have a common center line after assembly. A center shaft coupler consisting of three rigidly connected sections of the coupler drive shaft 23, the coupler load shaft 24 and the coupler sealing disk 25 rotatably connects both the drive crank shaft 21 and the load crank shaft 22 through the coupler drive bearing 51 and the coupler load bearing 52. Two symmetric balance weights attach to the drive crank shaft 21 and the load crank shaft 22. Set screws secure them on both crank shafts during operation. Two balance weight covers are mounted on the outer surface of the drive shaft support 29 and the load shaft support 30 to protect the corresponding balance weight.

A sensor 63 is mounted on the housing 26. It is located inside the chamber between the drive rubber seal 27, load rubber seal 28 and the housing 26. The sensor 63 is used to detect the possible leakage caused by defective drive rubber seal 27 and defective load rubber seal 28.

During operation, the drive crank shaft 21 rotates around its common center line with the load crank shaft 22. This rotation exerts a driving force and acts through the coupler drive bearing 51 on the coupler drive shaft 23 and forces it to follow the rotation. The strong coupler drive shaft 23 under this force does not tend to deform. Therefore, through the rigid connection, the coupler load shaft 24 handles the same force, which acts through the coupler load bearing 52 on the load crank shaft 22 and forces it to rotate. During operation, the center shaft coupler made of the coupler drive shaft 23, the coupler sealing disk 25 and the coupler load shaft 24 does not rotate around its own axis. The only movement of the center shaft coupler is a nutation following a circular trajectory. The coupler sealing disk 25 which rigidly connects both the coupler drive shaft 23 and the coupler load shaft 24 performs the same nutation. The drive rubber seal 27 and the load rubber seal 28 mounted on both sides of the coupler sealing disk 25 exert enough force to hold the coupler sealing disk 25 and prevent self rotation of the coupler sealing disk 25 should both the drive rubber seal 27 and the load rubber seal 28 twist.

The bearings to support the coupler drive shaft 23 and the coupler load shaft 24 minimize the friction force acting on them. Thus this friction force is not large enough to overcome the combined recovering force of the drive rubber seal 27 and the load rubber seal 28 against twisting deformation.

To increase the ability for the drive rubber seal 27 and the load rubber seal 28 to work under higher working pressure, different types of elastomers can be selected. A flexible metal wire coat to wrap the outer surface of the drive rubber seal 27 and the load rubber seal 28 can also be used to handle high pressure fluid. A fiber reinforced layer in the rubber seal can be added during rubber part molding procedure. The radius of circular nutation trajectory is the center offset of eccentric bore 72 away from the common center line of the drive crank shaft 21 and the load crank shaft 22. This distance is also the working moment arm for the coupler load shaft 24 to drive the load crank shaft 22.

Since both ends of the drive rubber seal 27 and the load rubber seal 28 are statically and seamlessly mounted on two solid, flat and rigid surfaces, there is no leakage path. Also, the driving torque can be fully transferred through this configuration since the whole structure works the same way as a continuous solid rotary shaft. During operation, the end of the drive rubber seal 27 and the end of the load rubber seal 28 mounted on the coupler sealing disk 25 surface have traverse deformation only. The deformed distance is equal to the radius of circular nutation trajectory of the coupler sealing disk 25. This deformation is so small compared to the ability of rubber materials to sustain elongation that it can achieve more than 200 percent of its original length. More further, to reduce the possible stress due to traverse deformation, the drive rubber seal 27 and the load rubber seal 28 are designed in a convoluted shape to induce more flexibility under traverse deformation.

Two balance weights are used to eliminate the possible vibration under various rpm's due to the eccentric location of the center shaft coupler. A sensor 63 can be used to detect working fluid properties such as pressure, temperature, moisture, etc. This helps to ensure proper operation if the load rubber seal 28 under high working pressure fails for any reason and the drive rubber seal 27 is still intact. This contains the leaking fluid inside the sensor 63 chamber and prevents it from escaping into the environment. The sizes of the drive crank shaft 21 and the load crank shaft 22 can be very small to very large due to load capability required for different applications. In any case no expensive high surface finishing is needed for the rotary shaft, so it is a simple, effective and inexpensive design.

FIG. 1 is a perspective view of an assembled rotary shaft sealing device. The device is symmetric. Since it is symmetric, either side can be considered as the drive side and the other side the load side. For convenient reference, the left side is labeled as the drive side under normal working pressure and right side as the load side under higher working pressure in the figure. The device can be mounted on the left housing 26 26ver or the right housing 26 26ver or on the housing 26 with additional mounting parts well known by those skilled in the art and used for different industrial applications.

The rotary shaft is not a continuous solid shaft. A drive crank shaft 21 and an identical load crank shaft 22 are used instead. The eccentric bore 72 on the drive crank shaft 21 and the load crank shaft 22 enables a solid center shaft coupler to be used as a mechanical key to connect the rotational drive crank shaft 21 and the load crank shaft 22.

The structure consists of three discrete components of rotary shaft that perform the same rotation as a single continuous solid rotary shaft. To eliminate the leaking path existing in a conventional single rotary shaft, the center shaft coupler does not rotate around its own axis when it rotates with the drive crank shaft 21 and the load crank shaft 22, to which it is connected through side section of the coupler drive shaft 23 and the coupler load shaft 24. This is realized by providing a self rotation freedom to the coupler drive shaft 23 and the coupler load shaft 24 with suitable bearings to support them, and by using the drive rubber seal 27 and the load rubber seal 28 attached to the coupler sealing disk 25 to prevent the center shaft coupler from self rotation. The left end of the drive rubber seal 27 is mounted on a stationary flat surface of the drive shaft support 29 and the other end on the left flat surface of the coupler sealing disk 25. Symmetrically the right end of the load rubber seal 28 is mounted on a stationary flat surface of the load shaft support 30 and the other end on the right flat surface of the coupler sealing disk 25. If both the drive rubber seal 27 and the load rubber seal 28 are not attached to the coupler sealing disk 25, the friction force induced from the coupler drive bearing 51 and the coupler load bearing 52 causes the center shaft coupler to rotate around its own axis. With the drive rubber seal 27 and the load rubber seal 28 firmly attached to it, however, this rotation causes the drive rubber seal 27 and the load rubber seal 28 twist.

Rubber materials have unique properties to recover from deformation. The recovering force is proportional to the deformed distance from its original location. Thus, the drive rubber seal 27 and the load rubber seal 28 under this twisting friction force yield an equal recovering force to reach an equilibrium point. Since the drive rubber seal 27 and the load rubber seal 28 are seamlessly mounted on the coupler sealing disk 25, the drive rubber seal 27 and the load rubber seal 28 divide the space into three isolated chambers: both the drive crank shaft 21 and the load crank shaft 22 have their own isolated chamber and a third, middle isolated chamber is located between them.

Working fluid entering from right side eventually stops inside the chamber enclosed by the load rubber seal 28 and the center shaft coupler. Similarly, the working fluid entering from left side eventually stops inside the chamber enclosed by the drive rubber seal 27 and the center shaft coupler. Therefore, the typical leaking path is eliminated completely. This is the "hermetic sealing" for the rotary shaft. The third, middle chamber is important for safety reasons. Typically, the pressure gradient of fluid causes failure of the load rubber seal 28 which works under high pressure so the leaking fluid enters the third isolated chamber. A electric sensor 63 in this chamber detects the leakage by measuring certain physical or chemical properties of the working fluid such as pressure, temperature, moisture, etc through thermocouple, pressure switch, and humidity probe. Before the drive rubber seal 27 on low pressure side fails under this higher working pressure of fluid, the electric sensor 63 produces a control electric signal for proper remedial operations to be performed. In fact, rubber materials have a very high modulus under compression, so the drive rubber seal 27 on the low working pressure side has higher strength under the compression of the working fluid. Thus the working fluid is contained in the middle isolated chamber without leaking to the low pressure side.

The drive crank shaft 21 and the load crank shaft 22 can be fabricated so that the inertia is balanced during rotation. In the case of the simple crank shaft used as shown in this figure, the drive balance base 31 and the load balance base 32 can be used to balance the inertia during rotation. The vibration due to eccentric location of the center shaft coupler can be reduced and minimized. Both the drive balance base 31 and the load balance base 32 can also hold additional drive balance adjust weight 35 and load balance adjust weight 36 to eliminate possible vibration caused by the influence of different working fluids with various densities.

Figure 2:
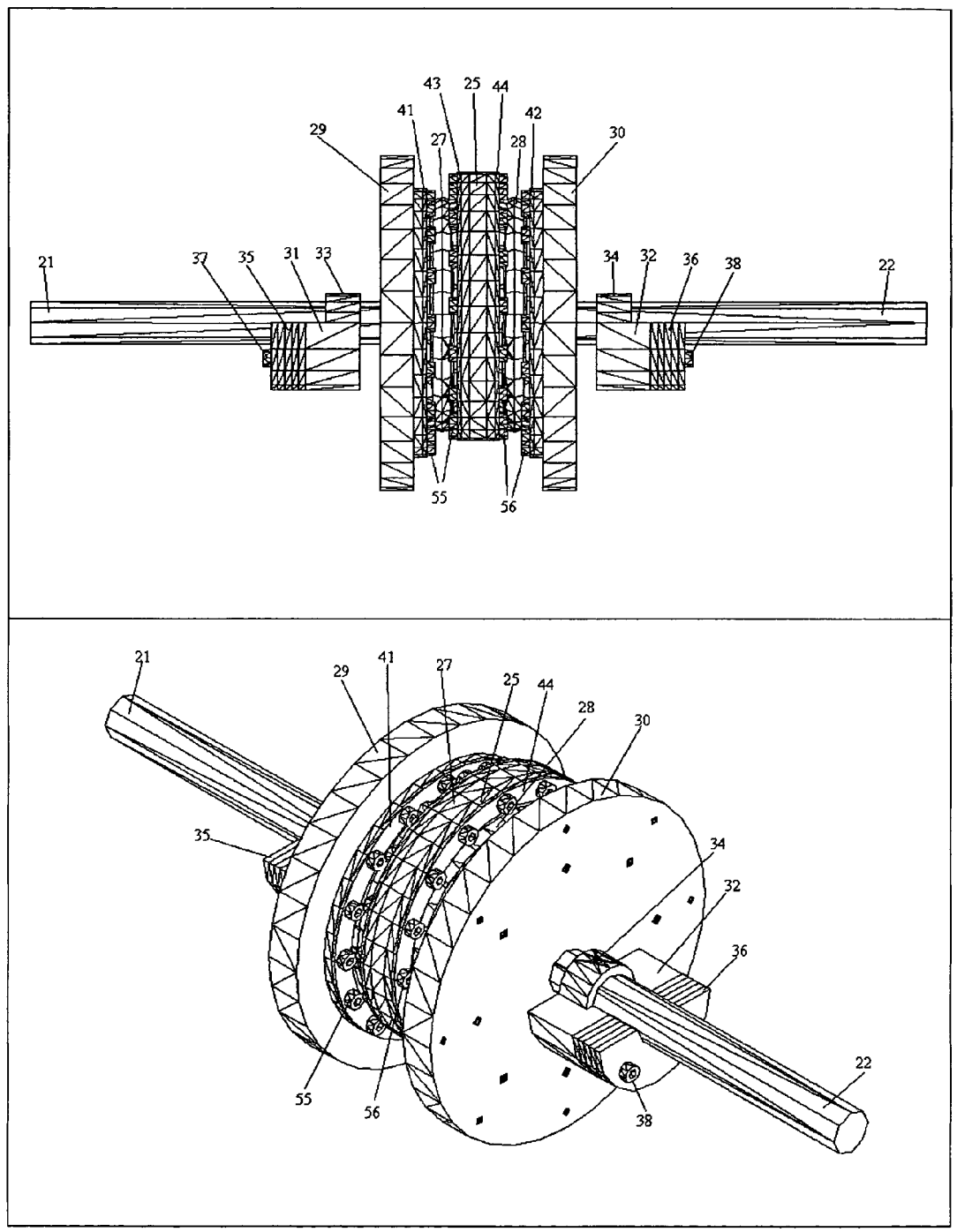
FIG. 2 is a perspective internal view of a sealing device.

FIG. 2 is a perspective view of the inside structure of the rotary shaft sealing device, without housing 26, drive balance weight cover 39 and load balance weight cover 40. Rubber seals are placed to eliminate the leaking path of fluid. A drive rubber seal 27 and a load rubber seal 28 are placed to seal both the drive crank shaft 21 and the load crank shaft 22. If leakage occurs, the leaking fluid must start from inside of the load rubber seal 28 for example, break the load rubber seal 28 and enter the sensor 63 chamber, then break the drive rubber seal 27 from outside and enter the drive rubber seal 27, then along the drive crank shaft 21 finally leaking into environment. The strength of rubber seals depends on the materials, physical dimension, and fabrication method. It can be designed to safely contain different working fluids under different pressures. Additional elastomeric materials can be used to fill the space of sensor 63 chamber to help both rubber seals withstand the pressure of the working fluid.

Figure 3:
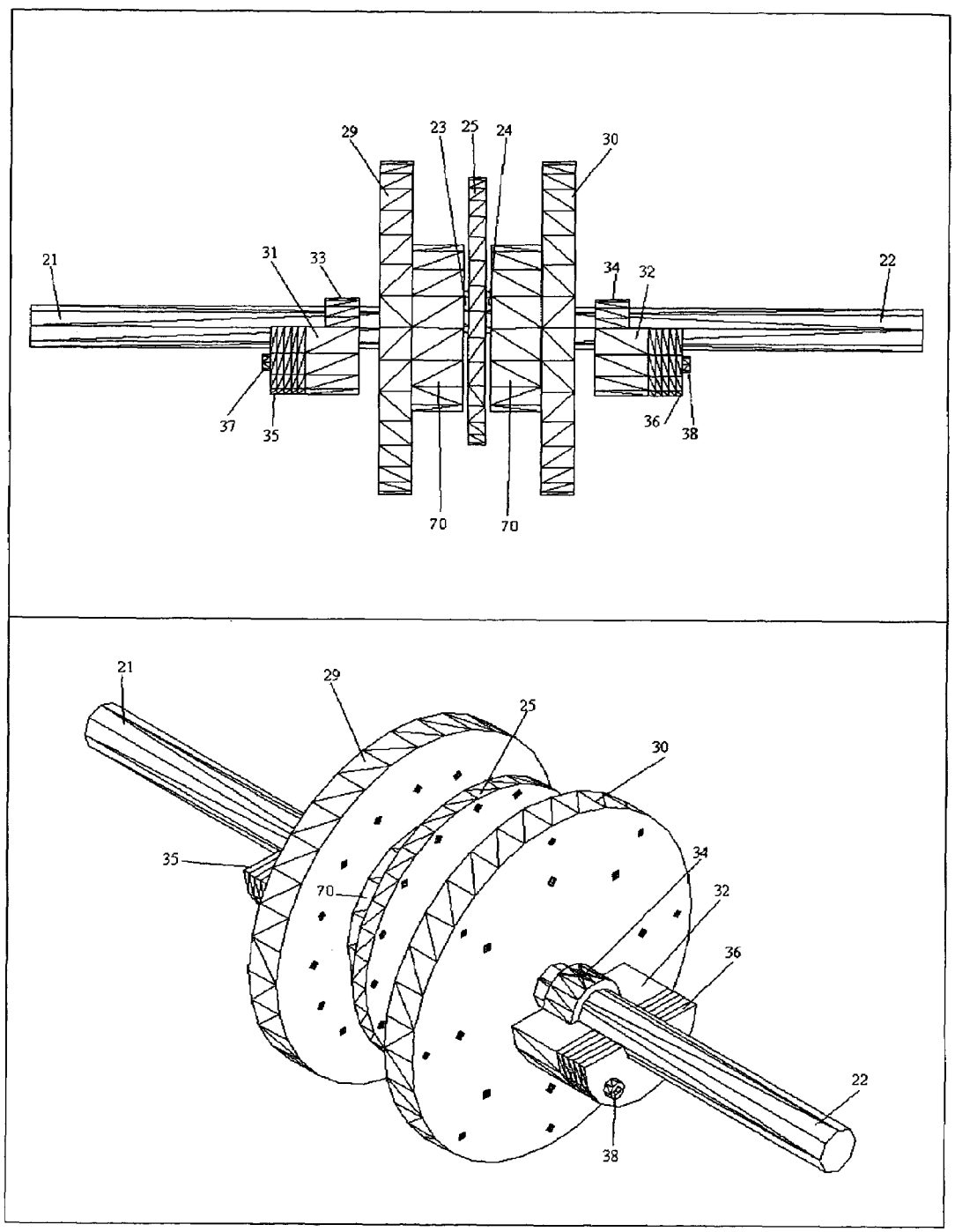
FIG. 3 is a perspective view of a basic torque transfer structure.

FIG. 3 is a perspective view of the assembled basic structure to transfer the torque. The drive crank shaft 21 and the load crank shaft 22 are mounted on a common base and center line. The center shaft coupler connects the drive crank shaft 21 and the load crank shaft 22 though a coupler drive bearing 51 and a coupler load bearing 52 attached on both of its corresponding ends. Since the center shaft coupler is placed eccentrically, it functions as a mechanical key to connect the rotational drive crank shaft 21 and the rotational load crank shaft 22, and thus, the rotation of the drive crank shaft 21 eventually drives the load crank shaft 22 to rotate through the center shaft coupler. The center offset of the center shaft coupler with respect to the common center line of both crank shafts can be seen from the side perspective view of FIG. 3.

Figure 4:
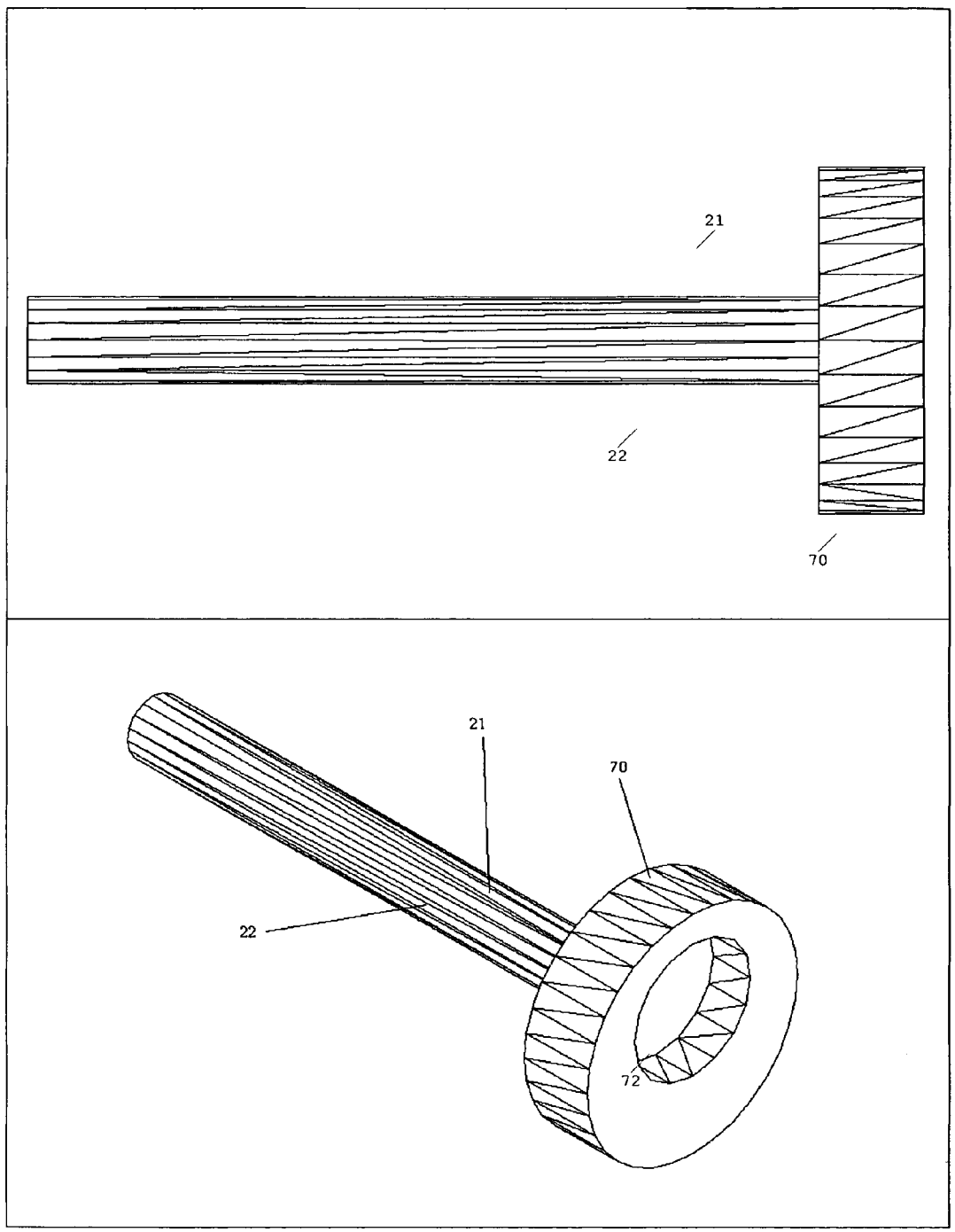
FIG. 4 is a perspective view of a crank shaft.

FIG. 4 is a perspective view of crank shaft. There are two identical crank shafts. The left crank shaft is the drive crank shaft 21 while the right crank shaft is the load crank shaft 22. Each crank shaft has a first end with a small diameter and a large shaft end 70 with larger diameter. The large shaft end 70 has an eccentric bore 72. The diameter of the eccentric bore 72 and depth of the eccentric bore 72 is equivalent to the dimensions of the coupler drive bearing 51 and the coupler load bearing 52 so the outer ring of each bearing fits tightly inside the eccentric bore 72 and does not move during operation. The diameter of the first small end of the crank shaft is equivalent to the diameter of the inner ring of the drive shaft support 29 29aring or the load shaft support 30 30aring.

The inner ring of coupler drive bearing 51 rotates with the drive crank shaft 21 during operation. Meanwhile the inner ring of the coupler load bearing 52 rotates with the load crank shaft 22. The outer diameter of the large shaft end 70 is determined by the strength which should be greater than a shaft, not shown with a normal, smaller diameter under the same bending moment. The length of the large shaft end 70 is set to ensure enough joint strength for each crank shaft so it operates as a whole piece without fatigue. The length of each crank shaft is long enough to hold other parts during assembly.

During operation, the rotation center line is the center line of the first end of each crank shaft. Thus, the center of the eccentric bore 72 in the large shaft end 70 follows a circular trajectory. Its radius is determined to be large enough to transfer torque within the normal load limit of the selected coupler drive bearing 51 and the coupler load bearing 52.

Figure 5:
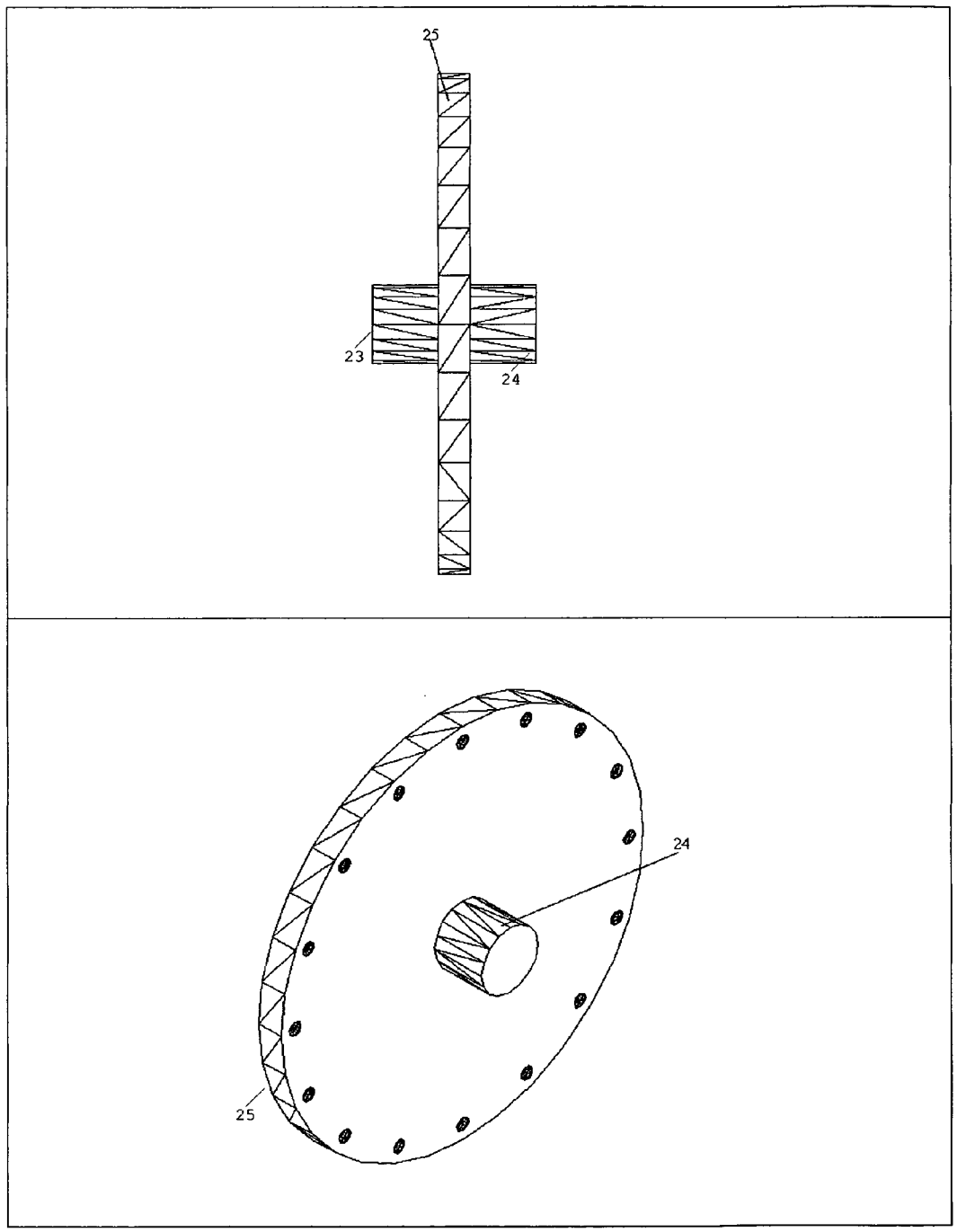
FIG. 5 is a perspective view of a shaft coupler.

FIG. 5 is a perspective view of a center shaft coupler. This solid, stiff center shaft coupler consists of three sections. The first coupler section is the coupler drive shaft 23 with the same diameter as the inner ring of the coupler drive bearing 51 that inserted in the eccentric bore 72 of large shaft end 70 of the drive crank shaft 21. The coupler drive shaft 23 receives drive torque from the drive crank shaft 21 through the coupler drive bearing 51, transfers the drive torque to the coupler load shaft 24 through rigidly connected coupler sealing disk 25 among them. The second coupler section is the solid, stiff coupler sealing disk 25 in the middle of the center shaft coupler. This section performs two basic functions. The first function is to transfer torque from the drive crank shaft 21 to the load crank shaft 22 during nutation, following a circular trajectory. The second function is to provide a platform to mount the drive rubber seal 27 and the load rubber seal 28 to form a hermetic sealing structure during operation. The third coupler section is the coupler load shaft 24. The coupler load shaft 24 receives the drive torque from the coupler drive shaft 23 through the coupler sealing disk 25 and acts the drive torque on the load crank shaft 22 through the coupler load bearing 52. The whole center shaft coupler first works as a mechanical key to connect two rotational crank shafts during operation, second, its nutation enables the drive rubber seal 27 and the load rubber seal 28 to be mounted on it without endless twisting during operation. Thus drive torque is fully transferred and hermetic sealing is realized as well.

Figure 6:
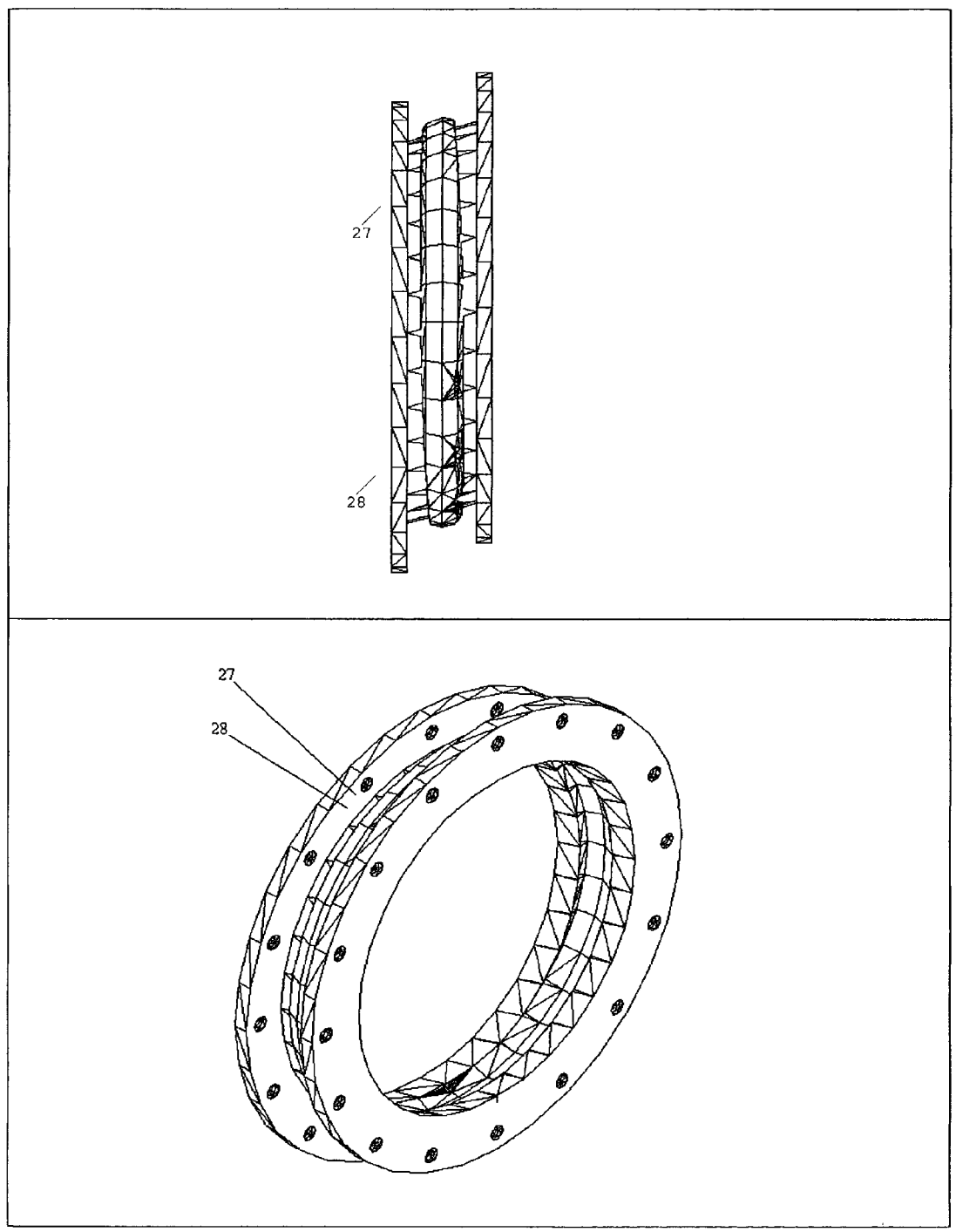
FIG. 6 is a perspective view of a rubber seal.

FIG. 6 is a perspective view of the drive rubber seal 27 and the load rubber seal 28. The convoluted drive rubber seal 27 and the load rubber seal 28 made of different elastomers and can be reinforced by adding a fabric layer inside the part and flexible metal wire coat wrapped outside. Such reinforcement is necessary for sealing the high pressurized fluid. The right end of the drive rubber seal 27 is mounted statically on the left side of the coupler sealing disk 25 and the other end on the drive shaft support 29. The left end of the load rubber seal 28 is mounted statically on the right side of the coupler sealing disk 25 and the other end on the load shaft support 30. To achieve seamless sealing, the first metal washer 41 and the third metal washer 43 and the drive rubber seal 27 27rews are used to press the drive rubber seal 27 firmly and seamlessly on the sealing surface of the coupler sealing disk 25 and the drive shaft support 29. Meanwhile the second metal washer 42, the fourth metal washer 44 and the load rubber seal 28 28rews are used to mount the load rubber seal 28 similarly. Sealant and glue can be used to bond two sealing surfaces if required.

Figure 7:
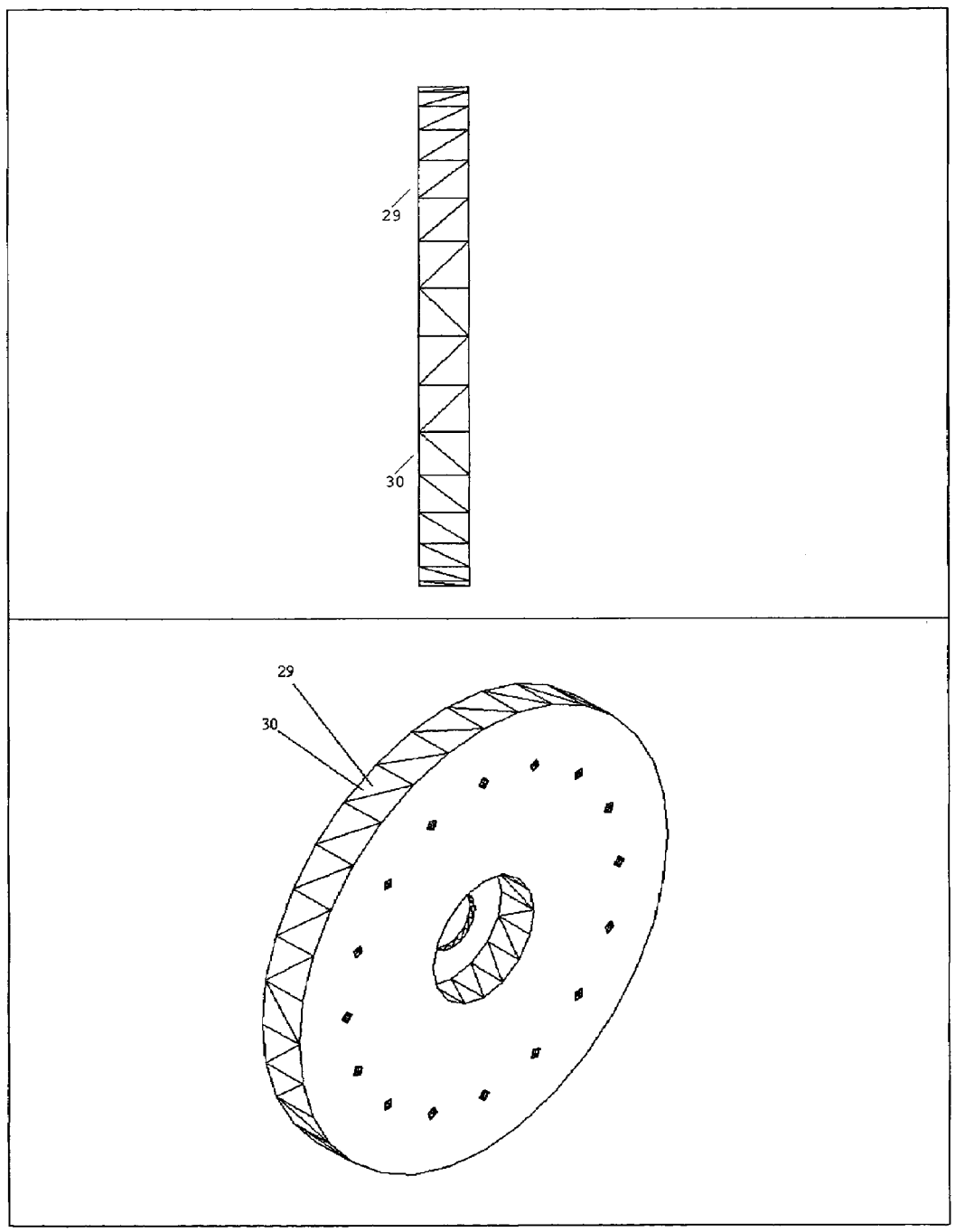
FIG. 7 is a perspective view of a shaft support.

FIG. 7 is a perspective view of the drive shaft support 29 and the load shaft support 30. Both the drive shaft support 29 and the load shaft support 30 have a bore at their center and can hold the corresponding drive shaft support 29 29aring and the load shaft support 30 30aring that is used to support the drive crank shaft 21 and the load crank shaft 22 respectively. Both the drive shaft support 29 and the load shaft support 30 align the drive crank shaft 21 and the load crank shaft 22 on a common center line, they are mounted on the left housing 26 26ver and the right housing 26 26ver to form a solid base of the rotary shaft sealing device. It is also used in mounting the drive balance weight cover 39 and the load balance weight cover 40.

Figure 8:
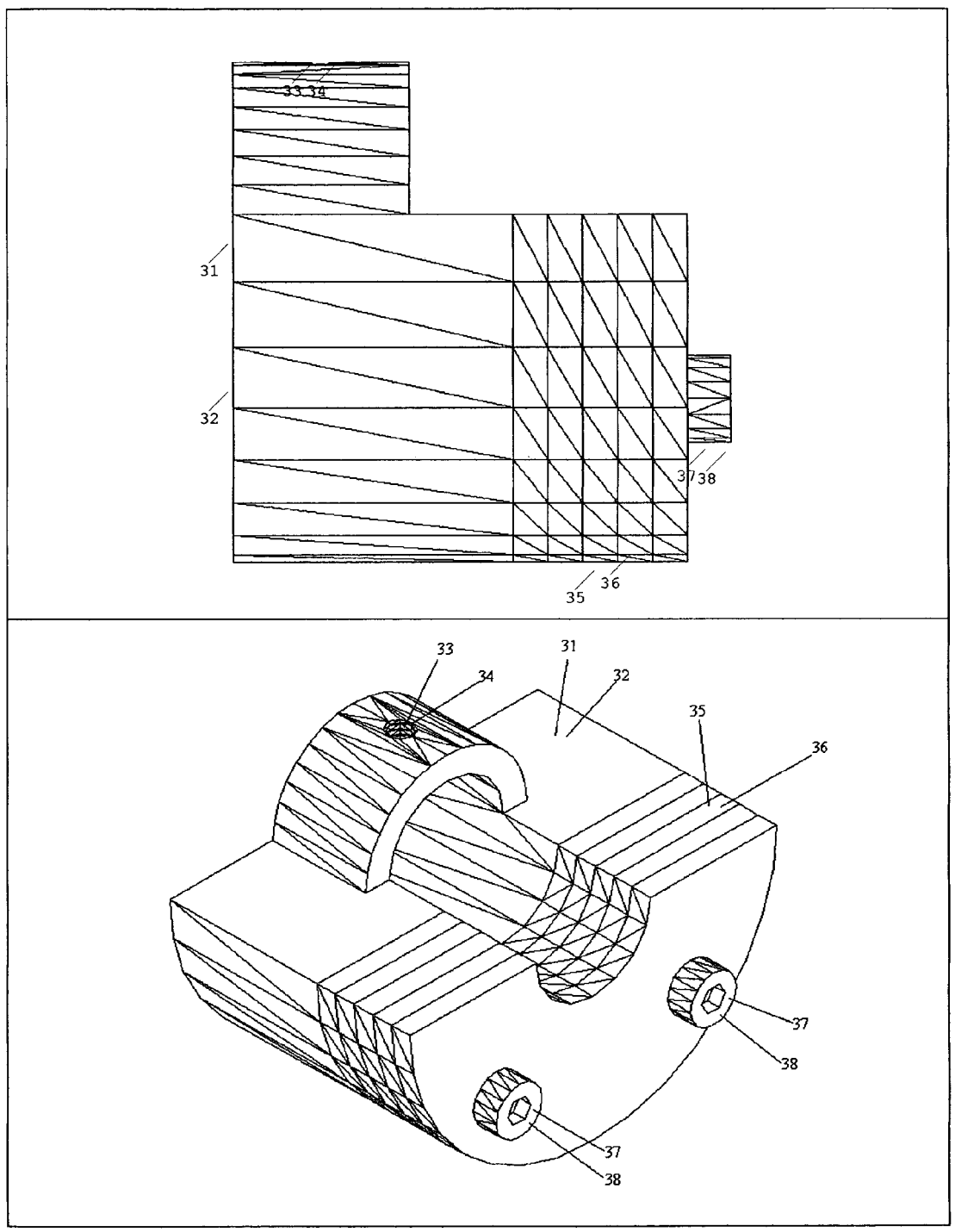
FIG. 8 is a perspective view of a balance weight.

FIG. 8 is a perspective view of the balance weight with components: drive balance base 31, drive balance base 31 31t screw, drive balance adjust weight 35, drive balance adjust screws 37, load balance base 32, load balance base 32 32t screw, load balance adjust weight 36 and load balance adjust screws 38. Balance weight is used to balance the inertia of the rotational structure. Since the center shaft coupler is placed eccentrically, vibration can occur. For high rpm's, the vibration must be reduced by a suitable balance weight. If the working fluid is viscous liquid and its density is not negligible, additional vibration could occur due to the mass volume enclosed in each rubber seal chamber. The balance weight can be adjusted conveniently for this purpose.

Figure 9:
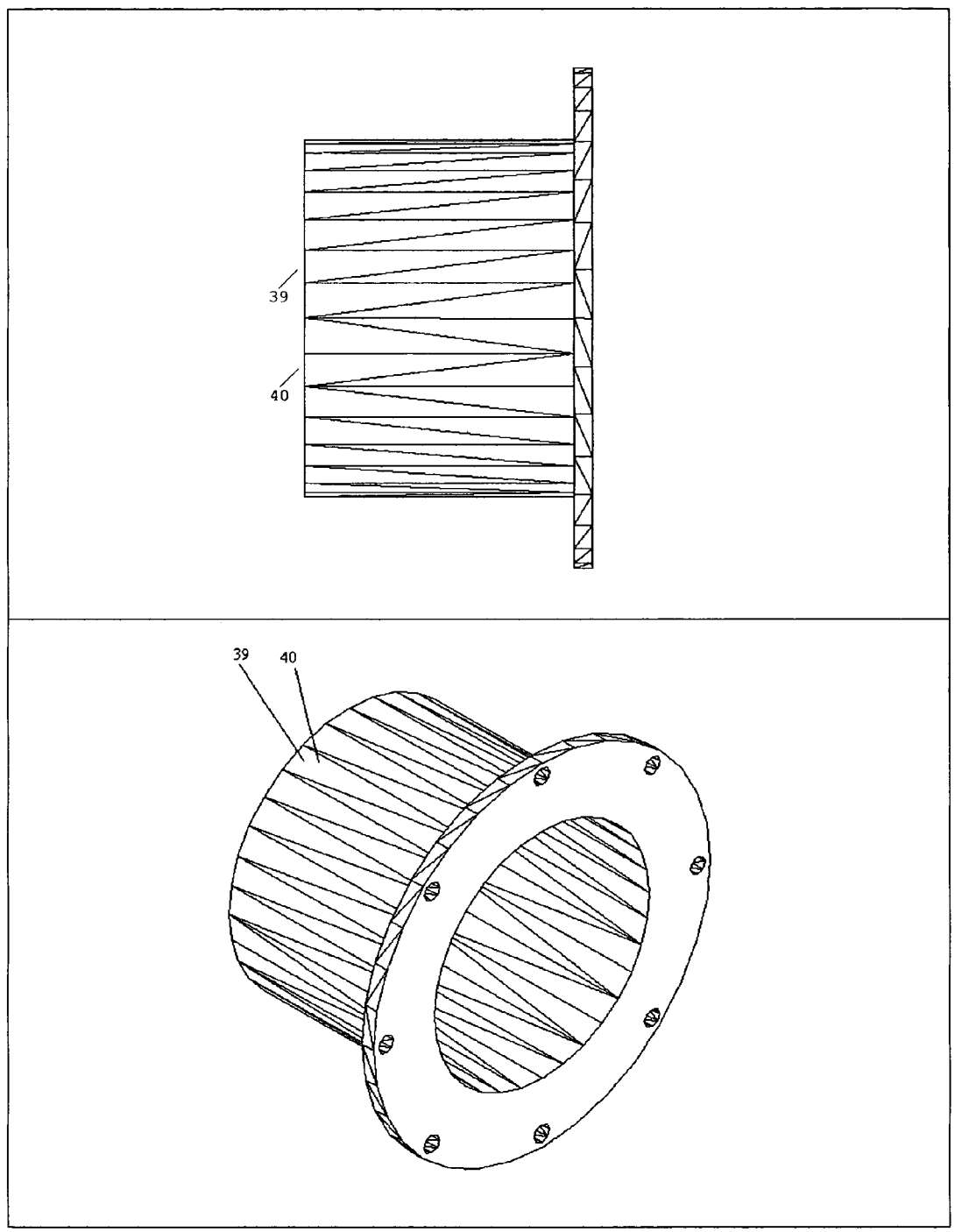
FIG. 9 is a perspective view of a balance weight cover.

FIG. 9 is a perspective view of the drive balance weight cover 39 and the load balance weight cover 40. Each balance weight cover is used to cover the corresponding balance weight during operation.

Figure 10:
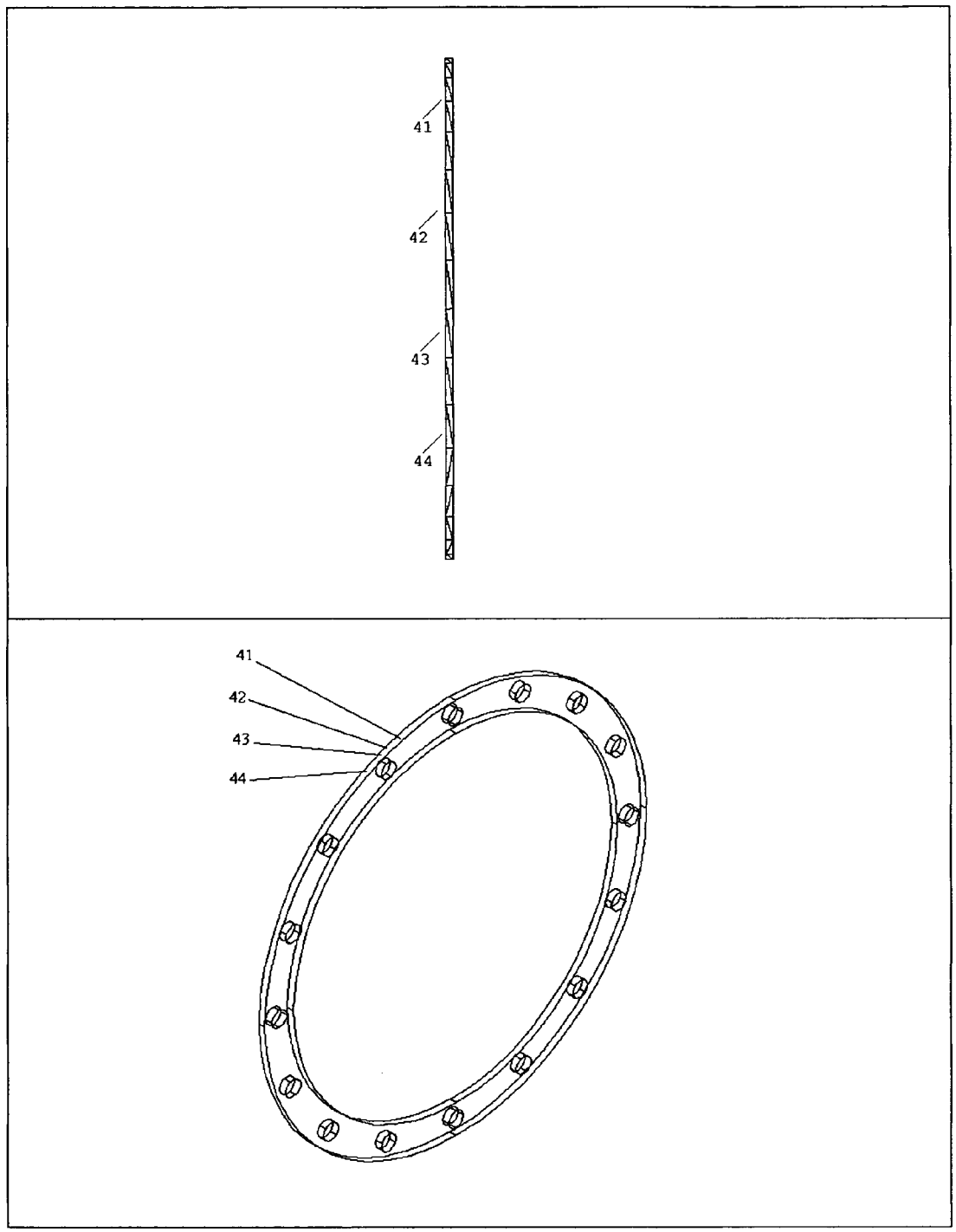
FIG. 10 is a perspective view of a metal washer.

FIG. 10 is a perspective view of the first metal washer 41, the second metal washer 42, the third metal washer 43 and the fourth metal washer 44. Both the first metal washer 41 and the third metal washer 43 are used to mount the drive rubber seal 27 on the drive shaft support 29 and the coupler sealing disk 25 respectively. Both the second metal washer 42 and the fourth metal washer 44 are used to mount the load rubber seal 28 on the load shaft support 30 and the coupler sealing disk 25 respectively.

Figure 11:
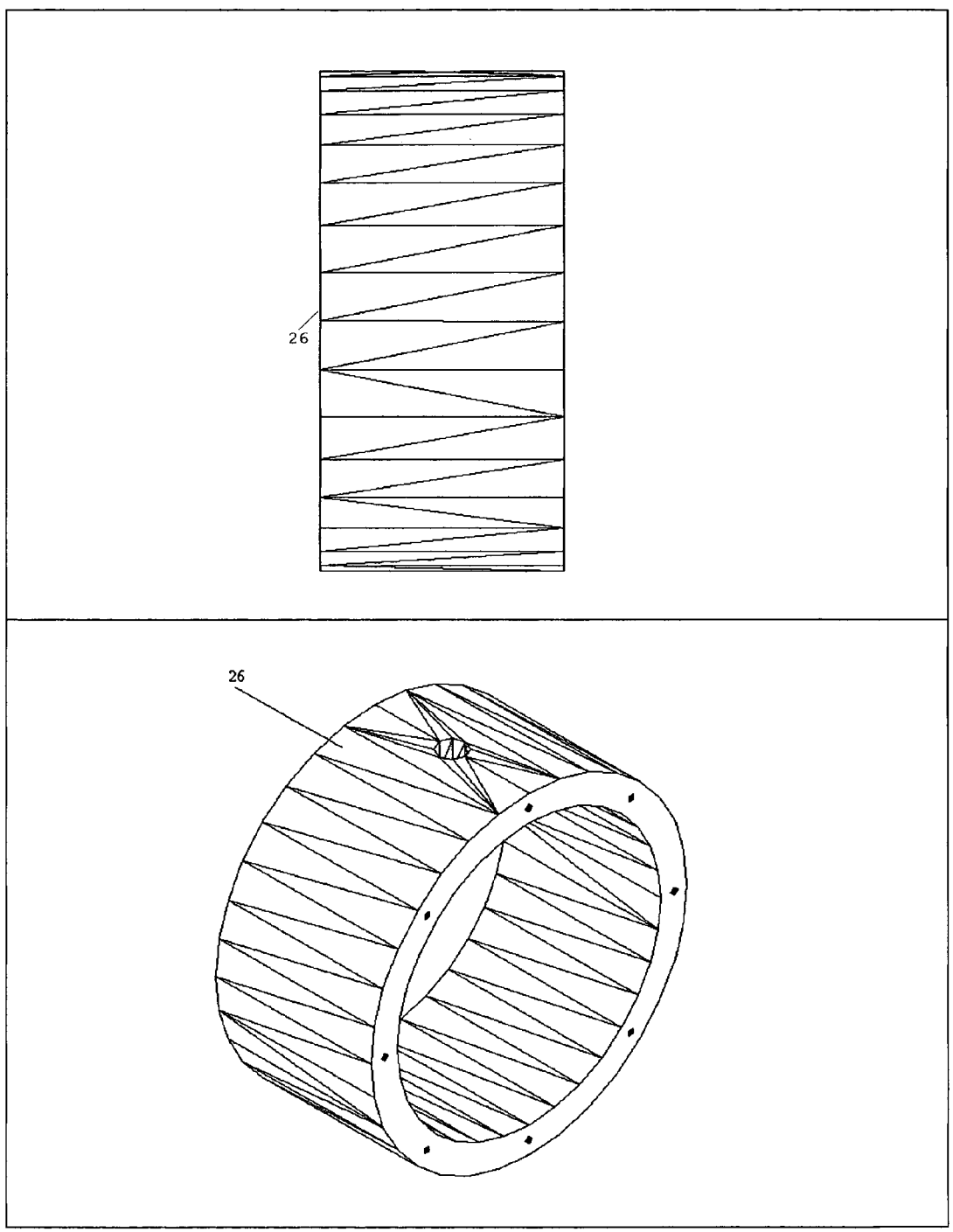
FIG. 11 is a perspective view of a housing.

FIG. 11 is a perspective view of housing 26. The main function of housing 26 is it connects the drive shaft support 29 and the load shaft support 30 with the left housing 26 26ver and the right housing 26 26ver to form a common solid base during operation. The second function of housing 26 is it encloses the whole sealing structure in order to provide secondary protection. The third function of the housing 26 is it holds the sensor 63 to detect possible leakage and control the operation.

Figure 12:
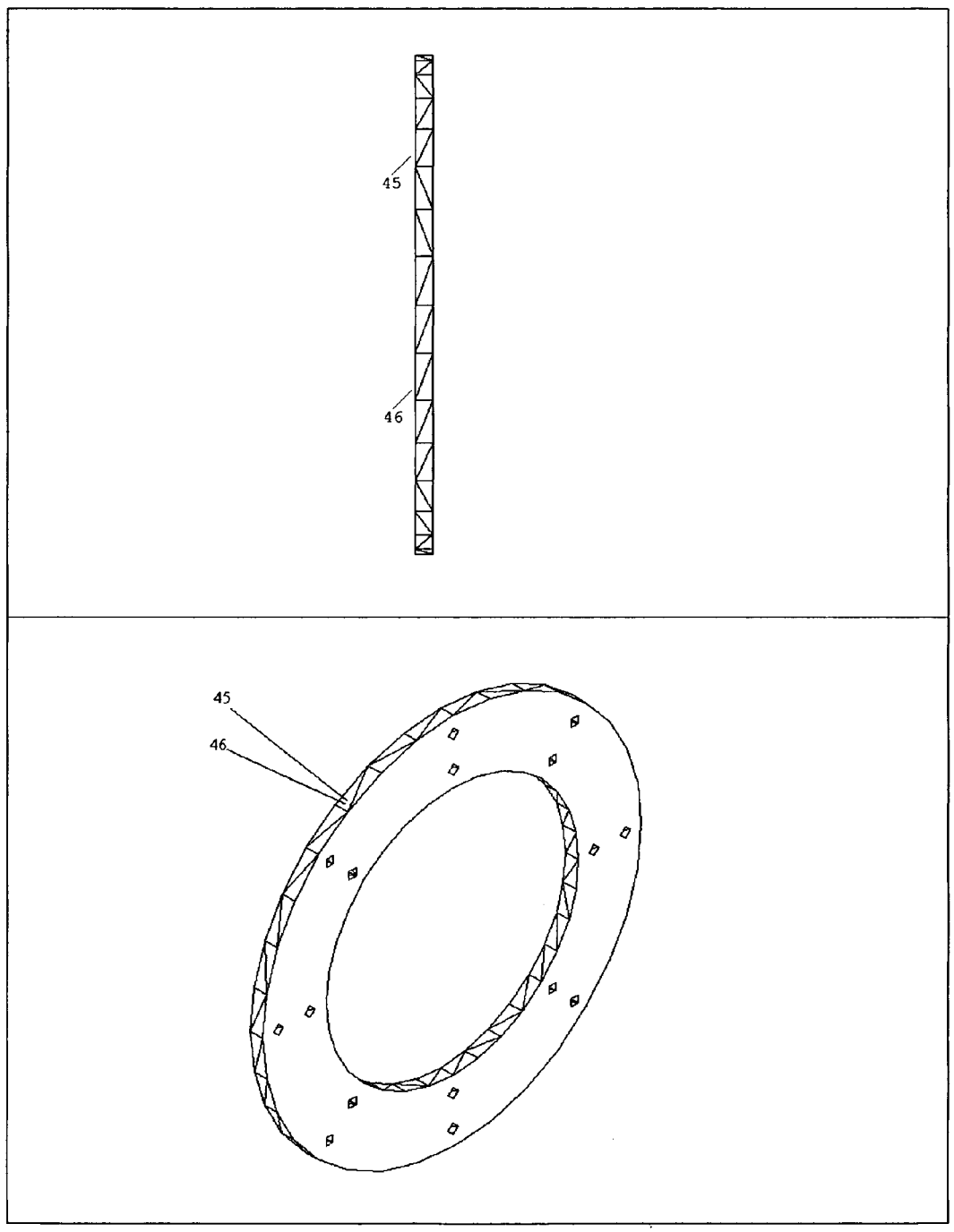
FIG. 12 is a perspective view of a housing cover.

FIG. 12 is a perspective view of the left housing 26 26ver and the right housing 26 26ver. The left housing 26 26ver is used to connect the drive shaft support 29 and the housing 26. Meanwhile the right housing 26 26ver is used to connect the load shaft support 30 and the housing 26. Thus, the drive side and the load side have a common solid base during operation.

Figure 13:
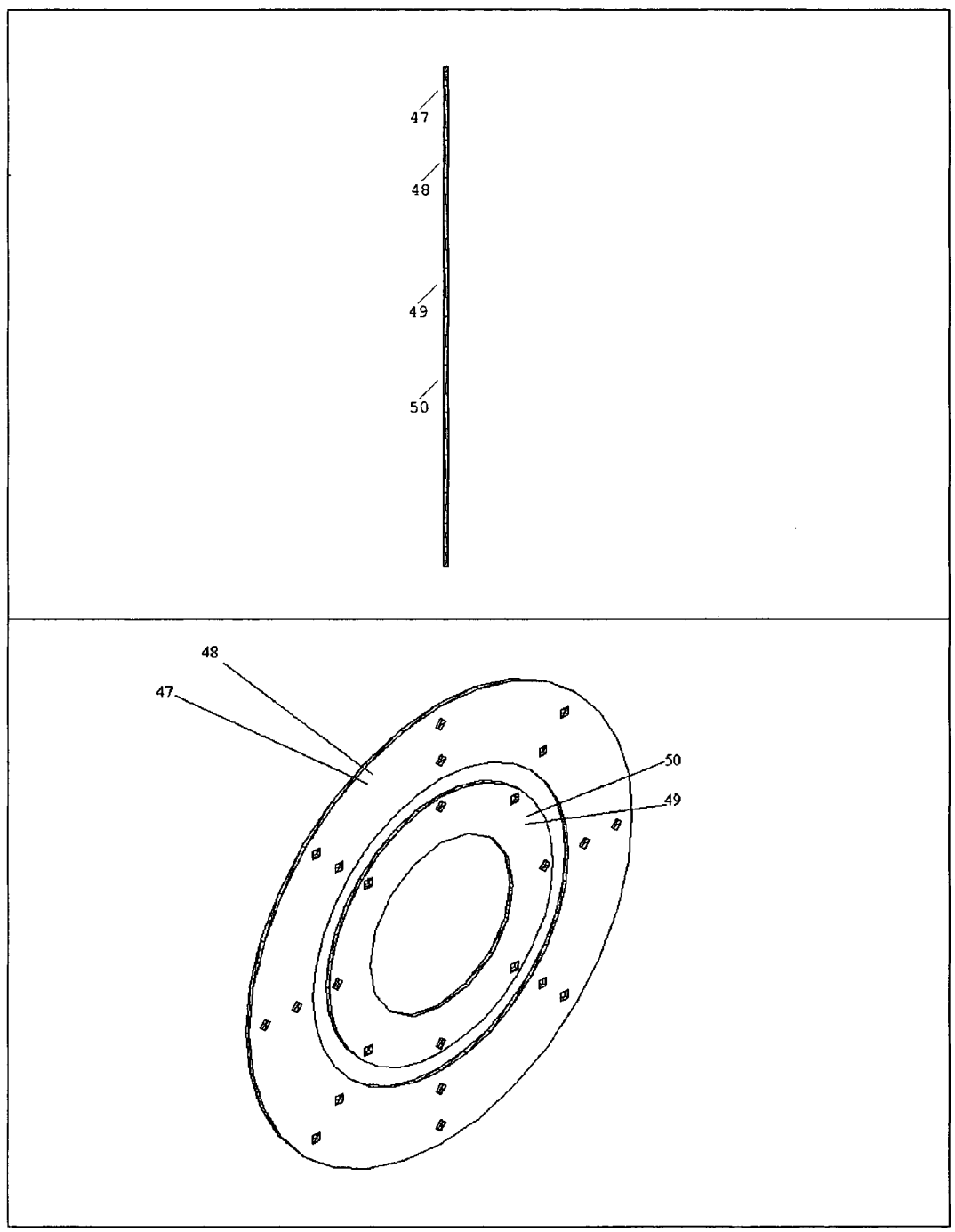
FIG. 13 is a perspective view of a rubber gasket.

FIG. 13 is a perspective view of the first rubber gasket 47, the second rubber gasket 48, the third rubber gasket 49 and the fourth rubber gasket 50. Each of them is a general rubber gasket used to statically seal the gap between two stationary surfaces. The first rubber gasket 47 seals the housing 26 and the left housing 26 26ver. The second rubber gasket 48 seals the housing 26 and the right housing 26 26ver. The third rubber gasket 49 seals the drive shaft support 29 and the drive balance weight cover 39. The fourth rubber gasket 50 seals the load shaft support 30 and the load balance weight cover 40. These static seals are important since even if the load rubber seal 28 fails under high pressurized fluid, with above good static sealing and a good drive rubber seal 27, the leaking fluid can still be contained inside sensor 63 chamber.

Figure 14:
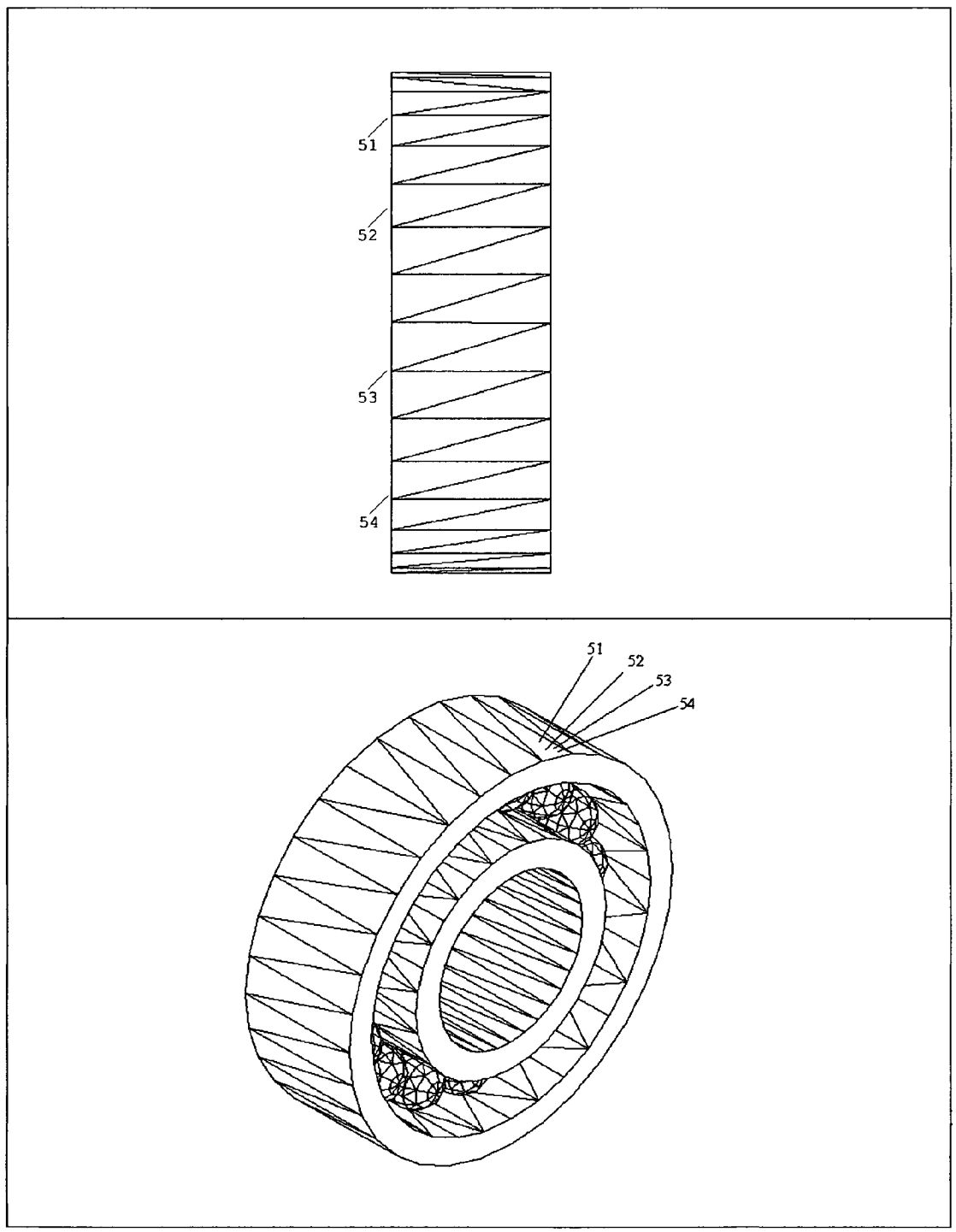
FIG. 14 is a perspective view of a ball bearing.

FIG. 14 is the perspective view of coupler drive bearing 51, coupler load bearing 52, drive shaft support 29 29aring and load shaft support 30 30aring. This is a ball bearing. Alternatively, to increase the load capability, a cylindrical roller bearing or a needle roller bearing can be used instead. The coupler drive bearing 51 and the coupler load bearing 52 in the corresponding eccentric bore 72 of the drive crank shaft 21 and the load crank shaft 22 give the center shaft coupler rotational freedom. Therefore, the friction force can be minimized during operation. This helps the center shaft coupler to perform nutation without twisting and breaking both the drive rubber seal 27 and the load rubber seal 28.

Figure 15:
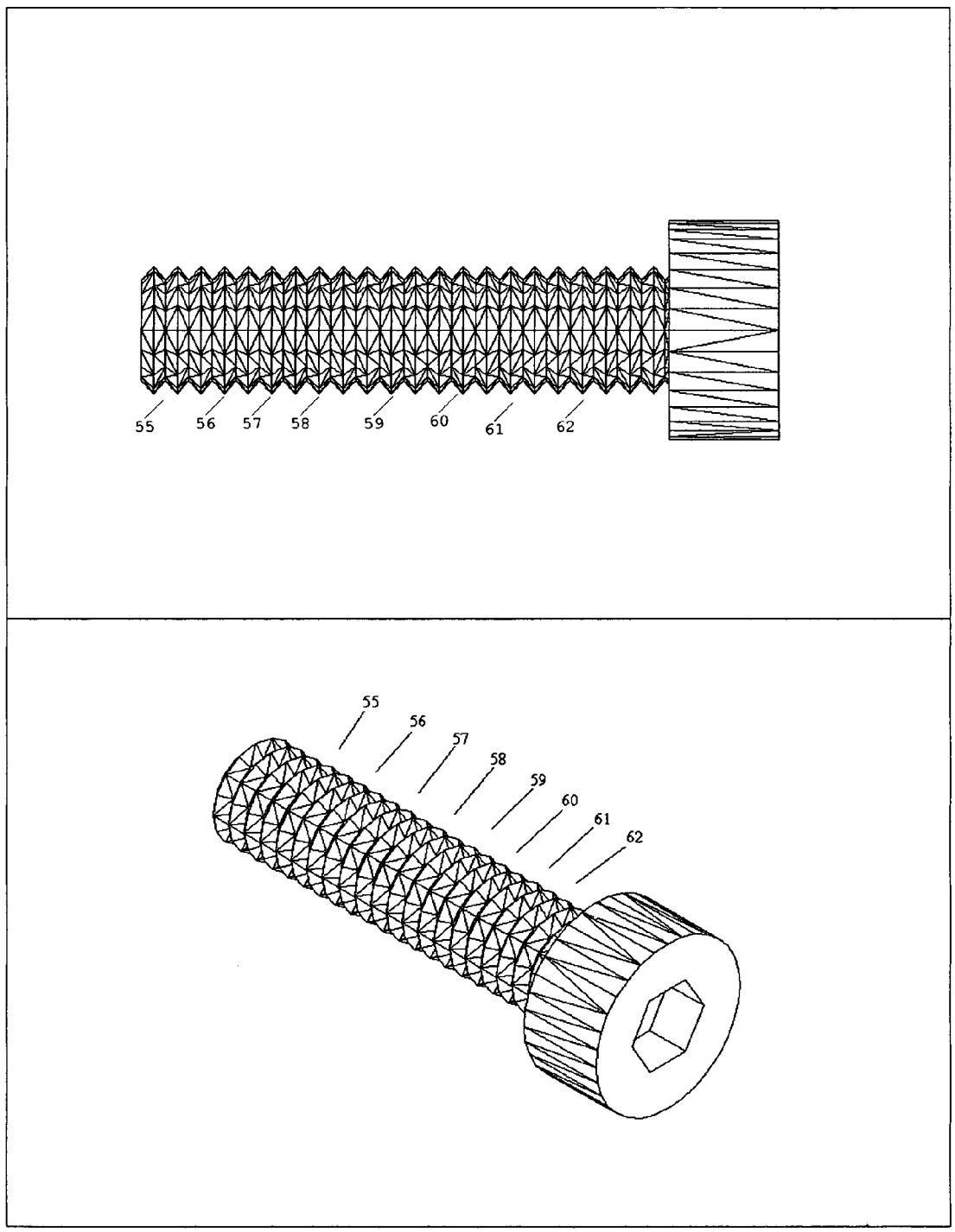
FIG. 15 is a perspective view of a screw.

FIG. 15 is the perspective view of drive rubber seal 27 27rews, load rubber seal 28 28rews, left housing 26 26unting screws, left housing 26 26ver mounting screws, right housing 26 26ver mounting screws, drive balance cover mounting screws 61, load balance cover mounting screws 62, drive balance adjust screws 37, load balance adjust screws 38. A cap head machine screw is shown in the drawing, but other types of screw can also be used. The point of using this type of screw is that the tool to tighten the screw will not break screw head during the assembly procedure, drive rubber seal 27 27rews mount the drive rubber seal 27 on the drive shaft support 29 and on the left side of the coupler sealing disk 25, load rubber seal 28 28rews mount the load rubber seal 28 on the load shaft support 30 and on the right side of the coupler sealing disk 25. Left housing 26 26unting screws mount the left housing 26 26ver on the left side of housing 26. Right housing 26 26unting screws mount the right housing 26 26ver on the right side of housing 26. Left housing 26 26ver mounting screws mount the left housing 26 26ver on the drive shaft support 29. Right housing 26 26ver mounting screws mount the right housing 26 26ver on the load shaft support 30, drive balance weight cover 39 screws mount the drive balance weight cover 39 on the drive shaft support 29, load balance weight cover 40 mounting screws mount the load balance weight cover 40 on the load shaft support 30, drive balance adjust screws 37 mount the drive balance adjust weight 35 on the drive balance base 31, load balance adjust screws 38 mount the load balance adjust weight 36 on the load balance base 32. Drive balance base 31 31t screw and load balance base 32 32t screw not shown here are those commonly used industrial set screws.

Figure 16:
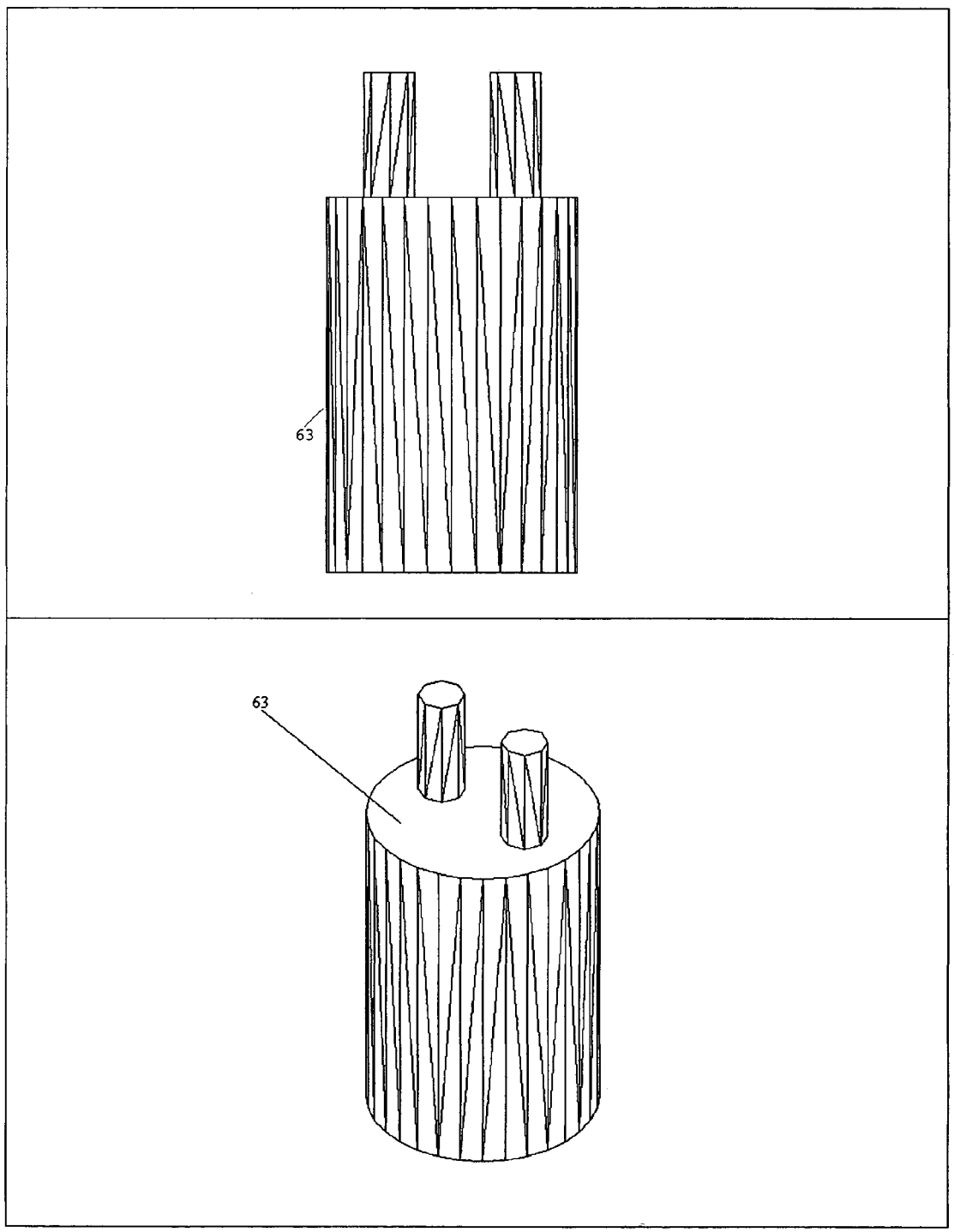
FIG. 16 is a perspective view of a sensor.

FIG. 16 is a perspective view of sensor 63. This is a general sensor 63 which can be replaced by a specific sensor 63 to detect fluid properties such as pressure, temperature, moisture, etc. With sensor 63 in this isolated middle chamber between two rubber seals, an electrical signal is generated when the load rubber seal 28 failed and the drive rubber seal 27 still functional for example. Thus, proper control operation can be performed.

Figure 17:
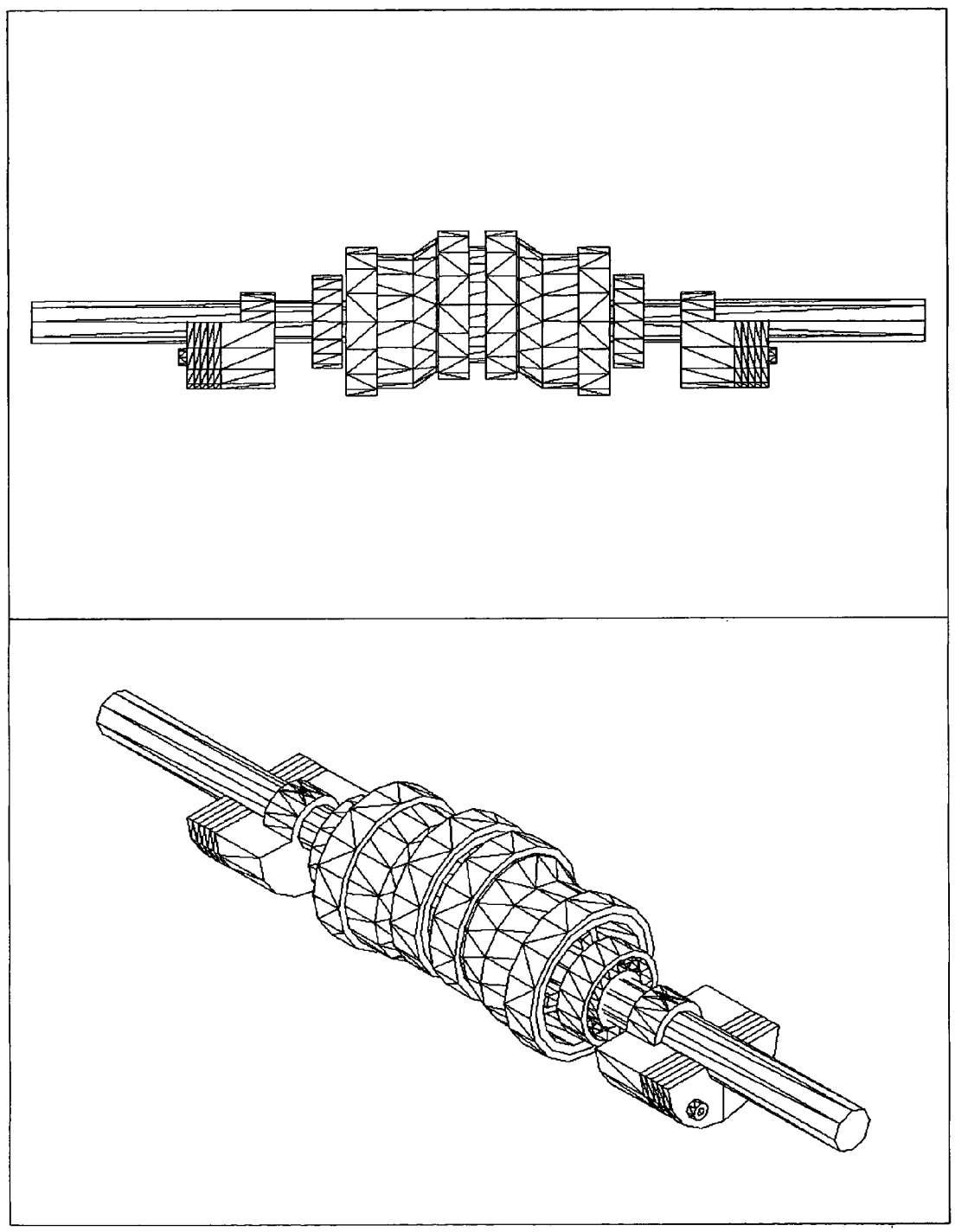
FIG. 17 is a perspective view of an alternative embodiment of torque transfer and sealing structure of the invention.

FIG. 17 is a perspective view of an alternative basic torque transfer and sealing structure. The drive crank shaft 21, the load crank shaft 22 and the center shaft coupler differ from the prescribed embodiment. The center shaft coupler is a short, stiff and rigid tube with a strong and thick wall. A stiff and solid wall seamlessly blocks the hollow channel of the tube in the middle. This solid wall divides the inside space of the center shaft coupler into two isolated chambers. The center shaft coupler with a thick wall is strong enough to withstand the bending moment during operation. A coupler drive bearing 51 and a coupler load bearing 52 fit tightly inside each of the isolated chambers. There is a drive crank shaft 21 and a load crank shaft 22. Each crank shaft has a first short crank end and a second long straight end. The center line of the second long straight end of both crank shafts is the common rotational center line during operation. The center offset of the first short crank end away from the common rotational center line is the working moment arm for the drive crank shaft 21 to drive the load crank shaft 22 through the center shaft coupler. Each short crank end of the drive crank shaft 21 and the load crank shaft 22 fits tightly inside the corresponding coupler drive bearing 51 and the coupler load bearing 52 in the isolated chambers of the center shaft coupler respectively. The assembled structure of the drive crank shaft 21 and the load crank shaft 22 with the center shaft coupler connecting them works same as a single continuous solid shaft during operation. Two rubber seals fit tightly on the outer edge of the center shaft coupler for the first end and on the outer edge of the stationary shaft support for the second end. The rubber seals prevent the center shaft coupler from self rotation during operation. Several seal clamps are used to firmly press on rubber seals to secure the seamless sealing.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. A rotary shaft hermetic sealing device for providing dynamically hermetic sealing for a rotary shaft and to fully transfer the torque under various rpm's comprising:

means for holding a coupler drive bearing to provide rotational freedom to a coupler drive shaft of a center shaft coupler;

means for holding a coupler load bearing to provide rotational freedom to a coupler load shaft of said center shaft coupler;

means for transmitting motion between a drive crank shaft and said center shaft coupler;

means for transmitting motion between said center shaft coupler and a load crank shaft;

means for holding rubber seals to provide hermetic sealing, rigidly connected to said means for transmitting motion between said center shaft coupler and said load crank shaft, and rigidly connected to said means for transmitting motion between said drive crank shaft and said center shaft coupler;

means for providing a solid, common base for said drive crank shaft and said load crank shaft;

means for sealing said drive crank shaft from fluid leakage, sealingly mounted to said means for holding rubber seals to provide hermetic sealing;

means for sealing said load crank shaft from fluid leakage, sealingly mounted to said means for holding rubber seals to provide hermetic sealing;

means for providing solid support base for said drive crank shaft during operation, sealingly mounted to said means for sealing said drive crank shaft from fluid leakage;

means for providing solid support base for said load crank shaft during operation, sealingly mounted to said means for sealing said load crank shaft from fluid leakage;

means for providing rotational innertia balance due to a eccentric bore on said drive crank shaft, adjustably mounted to said means for holding said coupler drive bearing to provide rotational freedom to said coupler drive shaft of said center shaft coupler;

means for providing rotational innertia balance due to a eccentric bore on said load crank shaft, adjustably mounted to said means for holding said coupler load bearing to provide rotational freedom to said coupler load shaft of said center shaft coupler;

means for adjusting the total balance weight to reduce vibration, removably mounted to said means for providing rotational innertia balance due to said eccentric bore on said drive crank shaft; and means for adjusting the total balance weight to reduce vibration, removably mounted to said means for providing rotational innertia balance due to said eccentric bore on said load crank shaft.

2. The rotary shaft hermetic sealing device in accordance with claim 1, wherein said means for holding said coupler drive bearing to provide rotational freedom to said coupler drive shaft of said center shaft coupler comprises said drive crank shaft, having high stiffness.

3. The rotary shaft hermetic sealing device in accordance with claim 1, wherein said means for holding said coupler load bearing to provide rotational freedom to said coupler load shaft of said center shaft coupler comprises said load crank shaft, having high stiffness.

4. The rotary shaft hermetic sealing device in accordance with claim 1, wherein said means for transmitting motion between said drive crank shaft and said center shaft coupler comprises a solid coupler drive shaft, having high bending modulus and high stiffness.

5. The rotary shaft hermetic sealing device in accordance with claim 1, wherein said means for transmitting motion between said center shaft coupler and said load crank shaft comprises a solid coupler load shaft, having high bending modulus and high stiffness.

6. The rotary shaft hermetic sealing device in accordance with claim 1, wherein said means for holding rubber seals to provide hermetic sealing comprises a rigid coupler sealing disk.

7. The rotary shaft hermetic sealing device in accordance with claim 1, wherein said means for providing said solid, common base for said drive crank shaft and said load crank shaft comprises a rigid housing.

8. The rotary shaft hermetic sealing device in accordance with claim 1, wherein said means for sealing said drive crank shaft from fluid leakage comprises a deformable drive rubber seal.

9. The rotary shaft hermetic sealing device in accordance with claim 1 wherein said means for sealing said load crank shaft from fluid leakage comprises a deformable load rubber seal.

10. The rotary shaft hermetic sealing device in accordance with claim 1, wherein said means for providing said solid support base for said drive crank shaft during operation comprises a drive shaft support, having a center bore to hold a drive shaft support bearing.

11. The rotary shaft hermetic sealing device in accordance with claim 1, wherein said means for providing said solid support base for said load crank shaft during operation comprises a load shaft support, having a center bore to hold a load shaft support bearing.

12. The rotary shaft hermetic sealing device in accordance with claim 1, wherein said means for providing rotational innertia balance due to said eccentric bore on said drive crank shaft comprises a drive balance base.

13. The rotary shaft hermetic sealing device in accordance with claim 1, wherein said means for providing rotational innertia balance due to said eccentric bore on a load crank shaft comprises a load balance base.

14. The rotary shaft hermetic sealing device in accordance with claim 1, wherein said means for adjusting the total balance weight to reduce vibration comprises a drive balance adjust weight.

15. The rotary shaft hermetic sealing device in accordance with claim 1, wherein said means for adjusting the total balance weight to reduce vibration comprises a load balance adjust weight.

16. A rotary shaft hermetic sealing device for providing dynamically hermetic sealing for a rotary shaft and to fully transfer the torque under various rpm s comprising:

a drive crank shaft, having high stiffness, for holding a coupler drive bearing to provide rotational freedom to a coupler drive shaft of a center shaft coupler;

a load crank shaft, having high stiffness, for holding a coupler load bearing to provide rotational freedom to a coupler load shaft of a center shaft coupler;

a solid coupler drive shaft, having high bending modulus and high stiffness, for transmitting motion between said drive crank shaft and said center shaft coupler;

a solid coupler load shaft, having high bending modulus and high stiffness, for transmitting motion between said center shaft coupler and said load crank shaft;

a rigid coupler sealing disk, for holding rubber seals to provide hermetic sealing, rigidly connected to said coupler load shaft, and rigidly connected to said coupler drive shaft;

a rigid housing, for providing a solid, common base for said drive crank shaft and said load crank shaft;

a drive rubber seal, being deformable, for sealing said drive crank shaft from fluid leakage, sealingly mounted to said coupler sealing disk;

a load rubber seal, being deformable, for sealing said load crank shaft from fluid leakage, sealingly mounted to said coupler sealing disk;

a drive shaft support, having a center bore to hold a drive shaft support bearing, for providing solid support base for said drive crank shaft during operation, sealingly mounted to said drive rubber seal;

a load shaft support, having a center bore to hold a load shaft support bearing, for providing solid support base for said load crank shaft during operation, sealingly mounted to said load rubber seal;

a drive balance base, for providing rotational innertia balance due to a eccentric bore on said drive crank shaft, adjustably mounted to said drive crank shaft;

a load balance base, for providing rotational innertia balance due to a eccentric bore on said load crank shaft, adjustably mounted to said load crank shaft;

a drive balance adjust weight, for adjusting the total balance weight to reduce vibration, removably mounted to said drive balance base; and a load balance adjust weight, for adjusting the total balance weight to reduce vibration, removably mounted to said load balance base.

17. The rotary shaft hermetic sealing device as recited in claim 16, further comprising: a left housing cover, for connecting the housing and said drive shaft support to form a common solid base for the device.

18. The rotary shaft hermetic sealing device as recited in claim 16, further comprising:

a right housing cover, for connecting the housing and said load shaft support to form a common solid base for the device.

19. The rotary shaft hermetic sealing device as recited in claim 16, further comprising:

a sensor, for detecting leaking fluid, removably mounted to said housing.

20. A rotary shaft hermetic sealing device for providing dynamically hermetic sealing for a rotary shaft and to fully transfer the torque under various rpm's comprising:

a solid drive crank shaft, having high bending modulus and high stiffness and a large end having an eccentric bore, for holding a coupler drive bearing to provide rotational freedom to a coupler drive shaft of a center shaft coupler;

a solid load crank shaft, having high bending modulus and high stiffness and a large end having an eccentric bore, for holding a coupler load bearing to provide rotational freedom to a coupler load shaft of said center shaft coupler;

a solid coupler drive shaft, having high bending modulus and high stiffness, for transmitting motion between said drive crank shaft and said center shaft coupler;

a solid coupler load shaft, having high bending modulus and high stiffness, for transmitting motion between said center shaft coupler and said load crank shaft;

a rigid coupler sealing disk, having high bending modulus and high stiffness and a flat surface on both sides and mounting screw holes on both sides, for holding rubber seals to provide hermetic sealing, rigidly connected to said coupler load shaft, and rigidly connected to said coupler drive shaft;

a rigid housing, having a flat edge and tapped screw holes and a sensor mounting hole, for providing a solid, common base for said drive crank shaft and said load crank shaft;

an elastic drive rubber seal, being fabric reinforced and deformable and having a flexible metal wire coat, for sealing said drive crank shaft from fluid leakage, sealingly mounted to said coupler sealing disk;

an elastic load rubber seal, being fabric reinforced and deformable and having a flexible metal wire coat, for sealing said load crank shaft from fluid leakage, sealingly mounted to said coupler sealing disk;

a solid drive shaft support, having a center bore to hold a drive shaft support bearing and mounting screw holes and a flat surface, for providing a solid support base for said drive crank shaft during operation, sealingly mounted to said drive rubber seal;

a solid load shaft support, having a center bore to hold a load shaft support bearing and mounting screw holes and a flat surface, for providing a solid support base for said load crank shaft during operation, sealingly mounted to said load rubber seal;

a drive balance base, being removeable and adjustable, for providing rotational innertia balance due to an eccentric bore on said drive crank shaft, adjustably mounted to said drive crank shaft;

a load balance base, being removeable and adjustable, for providing rotational innertia balance due to an eccentric bore on said load crank shaft, adjustably mounted to said load crank shaft;

a drive balance adjust weight, being removeable and adjustable and having high density, for adjusting the total balance weight to reduce vibration, removably mounted to said drive balance base;

a load balance adjust weight, being removeable and adjustable and having high density, for adjusting the total balance weight to reduce vibration removably mounted to said load balance base;

a rigid left housing cover, being removeable and having a flat surface and mounting screw holes, for connecting the housing and said drive shaft support to form a common solid base for the device;

a rigid right housing cover, being removeable and having a flat surface and mounting screw holes, for connecting the housing and said load shaft support to form a common solid base for the device; and a sensor, being detachable, for detecting leaking fluid, removably mounted to said housing.

* * * * *